US011519832B2

(12) United States Patent
Ragan et al.

(10) Patent No.: US 11,519,832 B2
(45) Date of Patent: Dec. 6, 2022

(54) SYSTEMS AND METHODS FOR SERIAL STAINING AND IMAGING

(71) Applicant: TissueVision, Inc., Somerville, MA (US)

(72) Inventors: Timothy Ragan, Somerville, MA (US); Chaim Moshe Dimant, Newton, MA (US)

(73) Assignee: TissueVision, Inc., Newton, MA (US)

( * ) Notice: Subject to any disclaimer, the term of this patent is extended or adjusted under 35 U.S.C. 154(b) by 0 days.

(21) Appl. No.: 17/035,040

(22) Filed: Sep. 28, 2020

(65) Prior Publication Data

US 2021/0199545 A1 Jul. 1, 2021

Related U.S. Application Data

(63) Continuation of application No. 15/556,862, filed as application No. PCT/US2016/022106 on Mar. 11, 2016, now Pat. No. 10,788,403.

(Continued)

(51) Int. Cl.
| | | |
|---|---|---|
| *G01N 1/06* | (2006.01) | |
| *G01N 1/30* | (2006.01) | |
| *G01N 1/31* | (2006.01) | |
| *G01N 1/42* | (2006.01) | |
| *G01N 21/64* | (2006.01) | |

(Continued)

(52) U.S. Cl.
CPC ............... *G01N 1/312* (2013.01); *G01N 1/06* (2013.01); *G01N 21/6428* (2013.01); *G01N 21/6458* (2013.01); *G01N 35/0099* (2013.01); *G02B 21/26* (2013.01); *G02B 21/367* (2013.01); *G01N 1/30* (2013.01); *G01N 1/42* (2013.01);

(Continued)

(58) Field of Classification Search
None
See application file for complete search history.

(56) References Cited

U.S. PATENT DOCUMENTS 4,960,330 A * 10/1990 Kerschmann ............ G01N 1/06
356/36
5,048,904 A 9/1991 Montagu
(Continued)

FOREIGN PATENT DOCUMENTS

| CN | 101395465 A | 3/2009 |
|---|---|---|
| CN | 102414716 A | 4/2012 |

(Continued)

OTHER PUBLICATIONS

Allen, Bringing CLARITY to the study of the brain. Retrieved online at: http://membercentral.aaas.org/blogs/qualia/bringing-clarity-study-brain. 3 pages. Mar. 11, 2013.

(Continued)

*Primary Examiner* — Soo Shin
(74) *Attorney, Agent, or Firm* — McCarter & English, LLP

(57) ABSTRACT

The present invention relates to systems and methods for sequential operation of staining, imaging and sectioning of tissue samples by a processing system. After each layer of the sample is removed by the sectioning system, the system automatically stains the exposed surface of a sample to a depth to enable imaging of the remaining tissue. The system then repeats the sectioning, staining and imaging steps in sequence to image the sample.

27 Claims, 12 Drawing Sheets

Related U.S. Application Data

(60) Provisional application No. 62/131,492, filed on Mar. 11, 2015.

(51) Int. Cl.
*G01N 35/00* (2006.01)
*G02B 21/16* (2006.01)
*G02B 21/24* (2006.01)
*G02B 21/26* (2006.01)
*G02B 21/36* (2006.01)

(52) U.S. Cl.
CPC ........ *G01N 2001/302* (2013.01); *G02B 21/16* (2013.01); *G02B 21/24* (2013.01)

(56) References Cited

U.S. PATENT DOCUMENTS

| | | | |
|---|---|---|---|
| 5,109,149 A | 4/1992 | Leung | |
| 5,139,338 A | 8/1992 | Pomerantz et al. | |
| 5,156,019 A | 10/1992 | McCormick | |
| 5,233,197 A | 8/1993 | Bowman et al. | |
| 5,583,342 A | 12/1996 | Ichie | |
| 5,633,695 A | 5/1997 | Feke et al. | |
| 5,691,839 A | 11/1997 | Kobayashi | |
| 5,700,346 A * | 12/1997 | Edwards | G01N 1/312 |
| | | | 156/364 |
| 5,740,708 A | 4/1998 | Tabone | |
| 5,783,814 A | 7/1998 | Fairley et al. | |
| 6,020,591 A | 2/2000 | Harter et al. | |
| 6,028,306 A | 2/2000 | Hayashi | |
| 6,219,179 B1 | 4/2001 | Nielsen et al. | |
| 6,248,988 B1 | 6/2001 | Krantz | |
| 6,387,653 B1 | 5/2002 | Voneiff et al. | |
| 6,392,795 B2 | 5/2002 | Okada | |
| 6,423,960 B1 | 7/2002 | Engelhardt et al. | |
| 6,449,039 B1 | 9/2002 | Bouzid | |
| 6,496,267 B1 | 12/2002 | Takaoka | |
| 6,603,537 B1 | 8/2003 | Dietz et al. | |
| 6,623,977 B1 | 9/2003 | Farquharson et al. | |
| 7,003,143 B1 | 2/2006 | Hewitt et al. | |
| 7,009,699 B2 | 3/2006 | Wolleschensky et al. | |
| 7,092,557 B2 | 8/2006 | Eisfeld et al. | |
| 7,110,118 B2 | 9/2006 | Unlu et al. | |
| 7,115,885 B2 | 10/2006 | Hell | |
| 7,139,415 B2 | 11/2006 | Finkbeiner | |
| 7,197,193 B2 | 3/2007 | Li et al. | |
| 7,209,287 B2 | 4/2007 | Lauer | |
| 7,215,469 B2 | 5/2007 | Nakata et al. | |
| 7,217,573 B1 | 5/2007 | Oshida et al. | |
| 7,274,446 B2 | 9/2007 | Wolleschensky et al. | |
| 7,329,860 B2 | 2/2008 | Feng et al. | |
| 7,366,394 B2 | 4/2008 | Takamatsu et al. | |
| 7,372,985 B2 | 5/2008 | So et al. | |
| 7,502,107 B2 | 3/2009 | Mohanty et al. | |
| 7,561,326 B2 | 7/2009 | Funk et al. | |
| 7,724,937 B2 | 5/2010 | So et al. | |
| 7,749,754 B2 | 7/2010 | Sherwood et al. | |
| 7,767,414 B1 | 8/2010 | Smith et al. | |
| 7,772,985 B2 | 8/2010 | Kobayashi et al. | |
| 7,863,585 B2 | 1/2011 | Hell et al. | |
| 7,869,132 B2 | 1/2011 | Saito et al. | |
| 8,238,632 B2 | 8/2012 | Wilson et al. | |
| 8,384,907 B2 | 2/2013 | Tearney et al. | |
| 8,728,799 B2 | 5/2014 | Schmitt | |
| 8,771,978 B2 | 7/2014 | Ragan | |
| 8,839,700 B2 | 9/2014 | Chen et al. | |
| 8,967,024 B2 | 3/2015 | Magavi et al. | |
| 8,995,733 B2 | 3/2015 | Van Dijk et al. | |
| 9,530,204 B2 | 12/2016 | Morimoto | |
| 9,551,658 B2 | 1/2017 | Hell et al. | |
| 9,719,928 B2 | 8/2017 | Hell | |
| 9,901,295 B2 * | 2/2018 | Iverson | B82Y 15/00 |
| 9,983,134 B2 | 5/2018 | Ragan | |
| 10,054,519 B2 | 8/2018 | Chen et al. | |
| 10,598,597 B2 | 3/2020 | Bahlman et al. | |
| 10,788,403 B2 | 9/2020 | Ragan et al. | |
| 10,908,087 B2 | 2/2021 | Ragan | |
| 2002/0190212 A1 | 12/2002 | Boas et al. | |
| 2002/0191884 A1 | 12/2002 | Letant et al. | |
| 2003/0132394 A1 | 7/2003 | Wolleschensky et al. | |
| 2003/0223107 A1 | 12/2003 | Olszak et al. | |
| 2004/0032650 A1 | 2/2004 | Lauer | |
| 2004/0076319 A1 | 4/2004 | Fauver et al. | |
| 2004/0110206 A1 | 6/2004 | Wong et al. | |
| 2004/0125372 A1 | 7/2004 | Walla et al. | |
| 2004/0228568 A1 | 11/2004 | Letant et al. | |
| 2004/0257562 A1 | 12/2004 | Wachsmuth | |
| 2004/0257646 A1 | 12/2004 | Wachsmuth | |
| 2005/0024637 A1 | 2/2005 | Olschewski | |
| 2005/0036667 A1 | 2/2005 | So et al. | |
| 2005/0046836 A1 | 3/2005 | Olschewski | |
| 2005/0046848 A1 | 3/2005 | Cromwell et al. | |
| 2005/0259319 A1 | 11/2005 | Brooker | |
| 2005/0260764 A1 | 11/2005 | Grigsby et al. | |
| 2006/0012875 A1 | 1/2006 | Wolleschensky | |
| 2006/0014287 A1 | 1/2006 | Sherwood et al. | |
| 2006/0139637 A1 | 6/2006 | Cho et al. | |
| 2006/0158655 A1 | 7/2006 | Everett et al. | |
| 2006/0179992 A1 | 8/2006 | Kermani | |
| 2006/0211752 A1 * | 9/2006 | Kohn | A61P 27/02 |
| | | | 514/389 |
| 2007/0038121 A1 | 2/2007 | Feldman et al. | |
| 2007/0057211 A1 | 3/2007 | Bahlman et al. | |
| 2007/0091428 A1 * | 4/2007 | Wilson | G02B 21/365 |
| | | | 359/391 |
| 2007/0229801 A1 | 10/2007 | Tearney et al. | |
| 2007/0254280 A1 | 11/2007 | Lexow et al. | |
| 2007/0258122 A1 | 11/2007 | Chamgoulov et al. | |
| 2007/0260138 A1 | 11/2007 | Feldman et al. | |
| 2008/0102006 A1 * | 5/2008 | Kram | G01N 35/1065 |
| | | | 222/1 |
| 2008/0130093 A1 | 6/2008 | Silberberg et al. | |
| 2008/0154128 A1 | 6/2008 | Milner | |
| 2008/0192231 A1 | 8/2008 | Jureller et al. | |
| 2009/0091566 A1 | 4/2009 | Turney et al. | |
| 2009/0093709 A1 | 4/2009 | Patel et al. | |
| 2009/0225399 A1 | 9/2009 | Zhao et al. | |
| 2010/0000383 A1 * | 1/2010 | Koos | G02B 21/367 |
| | | | 382/128 |
| 2010/0028978 A1 * | 2/2010 | Angros | G01N 35/00029 |
| | | | 435/283.1 |
| 2010/0081190 A1 | 4/2010 | Hyde et al. | |
| 2010/0081915 A1 | 4/2010 | Hyde et al. | |
| 2010/0093022 A1 | 4/2010 | Hayworth et al. | |
| 2010/0214404 A1 | 8/2010 | Chen et al. | |
| 2010/0265554 A1 | 10/2010 | Shirakura et al. | |
| 2010/0294949 A1 | 11/2010 | Sasaki et al. | |
| 2010/0323445 A1 | 12/2010 | Hayworth et al. | |
| 2011/0058178 A1 | 3/2011 | Tearney et al. | |
| 2011/0137126 A1 | 6/2011 | French et al. | |
| 2011/0320174 A1 | 12/2011 | Ragan et al. | |
| 2012/0163680 A1 | 6/2012 | Lefebvre | |
| 2012/0208184 A1 * | 8/2012 | Ragan | G01N 1/30 |
| | | | 435/7.1 |
| 2013/0010283 A1 | 1/2013 | Villiger et al. | |
| 2013/0019725 A1 | 1/2013 | Magavi et al. | |
| 2013/0045167 A1 * | 2/2013 | Melles | A61K 49/0071 |
| | | | 424/9.1 |
| 2013/0142413 A1 | 6/2013 | So et al. | |
| 2013/0149734 A1 | 6/2013 | Ammar et al. | |
| 2013/0203100 A1 * | 8/2013 | Otter | B01L 3/0293 |
| | | | 118/100 |
| 2014/0146376 A1 | 5/2014 | Kleppe et al. | |
| 2014/0232848 A1 | 8/2014 | Schwedt et al. | |
| 2014/0297199 A1 | 10/2014 | Osten | |
| 2014/0356876 A1 | 12/2014 | Ragan | |
| 2015/0276563 A1 * | 10/2015 | Carrigan | G01N 1/30 |
| | | | 435/40.5 |
| 2016/0003715 A1 * | 1/2016 | Torres | G01N 33/4833 |
| | | | 435/40.52 |
| 2016/0264973 A1 * | 9/2016 | Aceto | C12Q 1/6886 |
| 2016/0290895 A1 | 10/2016 | Daniel et al. | |

(56) References Cited

U.S. PATENT DOCUMENTS

| | | | |
|---|---|---|---|
| 2016/0377546 A1 | 12/2016 | Ragan et al. | |
| 2017/0199104 A1* | 7/2017 | Gradinaru | C12Q 1/6841 |
| 2019/0301980 A1 | 10/2019 | Anderson et al. | |
| 2021/0325308 A1* | 10/2021 | Kannan | G06N 3/0454 |

FOREIGN PATENT DOCUMENTS

| | | |
|---|---|---|
| CN | 106017975 A | 10/2016 |
| EP | 1580586 A1 | 9/2005 |
| EP | 2249194 A1 | 11/2010 |
| JP | H06-323967 A | 11/1994 |
| JP | 2000-193889 A | 7/2000 |
| JP | 2001-235401 A | 8/2001 |
| JP | 2001-249124 A | 9/2001 |
| JP | 2005-017127 A | 1/2005 |
| JP | 2005-508489 A | 3/2005 |
| JP | 2005-275206 A | 10/2005 |
| JP | 2006-010620 A | 1/2006 |
| JP | 2006-031004 A | 2/2006 |
| JP | 2006-178472 A | 7/2006 |
| JP | 2008-164521 A | 7/2008 |
| JP | 2008-197127 A | 8/2008 |
| JP | 2009-517662 A | 4/2009 |
| JP | 2009-150864 A | 7/2009 |
| JP | 2010-008989 A | 1/2010 |
| JP | 2010-532878 A | 10/2010 |
| JP | 2010-250191 A | 11/2010 |
| JP | 2010-271569 A | 12/2010 |
| JP | 2011-527218 A | 10/2011 |
| JP | 2012-141287 A | 7/2012 |
| JP | 2013-113689 A | 6/2013 |
| RU | 426164 | 4/1974 |
| WO | WO-1998/02851 A | 1/1998 |
| WO | WO-2001/40769 A2 | 6/2001 |
| WO | WO-2001/42796 A1 | 6/2001 |
| WO | WO-2002/084265 A1 | 10/2002 |
| WO | WO-2006/127967 A2 | 11/2006 |
| WO | WO-2006/135769 A1 | 12/2006 |
| WO | WO-2007/099382 A1 | 9/2007 |
| WO | WO-2007/149971 A2 | 12/2007 |
| WO | WO-2010/045400 A3 | 7/2010 |
| WO | WO-2011/163484 A2 | 12/2011 |
| WO | WO-2012/068142 A2 | 5/2012 |
| WO | WO-2012/069076 A1 | 5/2012 |
| WO | WO-2012/172024 A1 | 12/2012 |
| WO | WO-2013/045078 A1 | 4/2013 |
| WO | WO-2013/126762 A1 | 8/2013 |
| WO | WO-2014/202998 A1 | 12/2014 |
| WO | WO-2015/046518 A1 | 4/2015 |
| WO | WO-2015/100421 A1 | 7/2015 |
| WO | WO-2016/145366 A8 | 10/2016 |
| WO | WO-2018/094290 A1 | 5/2018 |

OTHER PUBLICATIONS

Andresen et al., Time-multiplexed multifocal multiphoton microscope. Opt Lett. Jan. 15, 2001;26(2):75-7.

Augustinack et al., MRI parcellation of ex vivo medial temporal lobe. NeuroImage. Article in Press, May 2013, 8 pages.

Bewersdorf et al., Multifocal Multi-Photon Microscopy. Handbook of Biological Confocal Microscopy, Third Edition. James H. Pawley (Ed.). Springer Science+Business Media, LLC. pp. 550-551, (2006).

Bewersdorf et al., Multifocal multiphoton microscopy. Opt Lett. May 1998;23(9):655-7.

Bird et al., Fibre-optic two-photon scanning fluorescence microscopy. J Microsc. Oct. 2002;208(Pt 1):35-48.

Bird et al., Two-photon fluorescence endoscopy with a micro-optic scanning head. Opt Lett. Sep. 1, 2003;28(17):1552-4.

Buist et al., Real time two-photon absorption microscopy using multi point excitation. Journal of Microscopy. Nov. 1998;192(2):217-226.

Cambridge Technology, Inc., Model 6240H Galvanometer Optical Scanner, Instruction Manual, www.cambridgetechnology.com. 22 pages, Sep. 23, 2004.

Cha et al., Non-descanned multifocal multiphoton microscopy with a multianode photomultiplier tube. AIP Advances. 2015;5:084802, 14 pages.

Chasles et al., Optimization and characterization of a structured illumination microscope. Opt Express. Nov. 26, 2007;15(24):16130-40.

Denk et al., Two-photon Laser Scanning fluorescence microscopy. Science. Apr. 6, 1990;248:73-76.

Dubois et al., High-resolution full-field optical coherence tomography with a Linnik microscope. Appl Opt. Feb. 1, 2002;41(4):805-12.

Ducros et al., Efficient large core fiber-based detection for multi-channel two-photon fluorescence microscopy and spectral unmixing. J Neurosci Methods. Jun. 15, 2011;198(2):172-80.

Economo et al., A platform for brain-wide imaging and reconstruction of individual neurons. Elife. Jan. 20, 2016;5:e10566, 34 pages.

Engelbrecht et al., Miniaturized selective plane illumination microscopy for high-contrast in vivo fluorescence imaging. Opt Lett. May 1, 2010;35(9):1413-5.

Goldman, Lightning strikes twice: Optogenetics pioneer Karl Deisseroth's newest technique renders tissues transparent, yet structurally intact. Scope, Stanford Medicine. Retrieved online at: http://scopeblog.stanford.edu/2013/04/10/lightning-strikes-twice-optogenetics-pioneer-karl-deisseroths-newest-technique-renders-tissues-transparent-yet-structurally-intact/ 2 pages. Apr. 10, 2013.

Helmchen et al., A miniature head-mounted two-photon microscope: High-resolution brain imaging in freely moving animals. Neuron. Sep. 27, 2001;31(6):903-12.

Helmchen et al., Enhanced two-photon excitation through optical fiber by single-mode propagation in a large core. Appl Opt. May 20, 2002;41(15):2930-4.

Helmchen et al., Miniaturization of two-photon microscopy for imaging in freely moving animals. Cold Spring Harb Protoc. Oct. 1, 2013;2013(10):904-13.

Helmchen, Miniaturization of fluorescence microscopes using fibre optics. Exp Physiol. Nov. 2002;87(6):737-45.

Hillman et al., Depth-resolved optical imaging and microscopy of vascular compartment dynamics during somatosensory stimulation. Neuroimage. Mar. 2007;35(1):89-104.

Jeong et al., Combined two-photon microscopy and optical coherence tomography using individually optimized sources. Opt Express. Jul. 4, 2011;19(14):13089-96.

Jung et al., Multiphoton endoscopy. Opt Lett. Jun. 1, 2003;28(11):902-4.

Kim et al., High speed handheld multiphoton multifoci microscopy. Proc. SPIE Int. Soc. Opt. Eng.; Progress in Biomedical Optics and Imaging—Multiphoton microscopy in the Biomedical Sciences IV. Jun. 2004;5353:267-272.

Kim et al., High-speed, two-photon scanning microscope. Appl Opt. Oct. 1, 1999 ;38(28):6004-9.

Kim et al., Multifocal multiphoton microscopy based on multianode photomultiplier tubes. Optics Express. Sep. 3, 2007;15(18):11658-11678.

Kim et al., Optical biopsy in high-speed handheld miniturized multifocal multiphoton microscopy. Progr. Biomed. Opt. Imaging Proc. SPIE: Multiphoton Microscopy in the Biomedical Sciences V. Mar. 2005;5700:14-22.

Kim et al., Three-Dimensional Image Cytometer Based on a High-Speed Two-Photon Scanning Microscope. Proc SPIE. Apr. 2001;4262:238-46.

Kim et al., Usage of multi anode PMT on the multi-photon fluorescence spectroscopy and video rate microscopy. 24th Annual Conference and the Annual Fall Meeting of the Biomedical Engineering Society EMBS/BMES Conference. Proceedings of the Second Joint Engineering in Medicine and Biology, p. 1206. 2002.

Konig, Multiphoton microscopy in life sciences. J Microsc. Nov. 2000;200(Pt 2):83-104.

Leveque-Fort et al., Fluorescence lifetime imaging with multifocal two-photon microscope. Proceedings of SPIE—The International Society for Optical Engineering. Jun. 2004;5323(1):99-107.

(56) References Cited

OTHER PUBLICATIONS

Leveque-Fort et al., Time-resolved multifocal multiphoton microscopy. Proceedings of SPIE—The International Society for Optical Engineering. Jun. 2003;5139:173-179.

Lim et al., Wide-field fluorescence sectioning with hybrid speckle and uniform-illumination microscopy. Opt Lett. Aug. 15, 2008;33(16):1819-21.

Makhlouf et al., A dual modality fluorescence confocal and optical coherence tomography microendoscope. Endoscopic Microscopy V. Guillermo J. Tearney (Ed.), Proceedings of SPIE BiOS. Feb. 24, 2010;7558:75580K-1-75580K-8.

Moneron et al., Two-photon excitation STED microscopy. Optics Express. Aug. 17, 2009;17(17):14567-14573.

Nielsen et al., High efficiency beam splitter for multifocal multiphoton microscopy. J Microsc. Mar. 2001;201(Pt3):368-76.

Osten, CSHL team introduces automated imaging to greatly speed whole-brain mapping efforts. Cold Spring Harbor, N.Y. 4 pages, Jan. 12, 2012.

Qin et al., 1D-Scanning Adressable Multiregional Multifocal Multiphoton Microscopy. Ultrafast Imaging and Spectroscopy. Proceedings of SPIE. Sep. 28, 2013;8845:884517. 9 pages.

Ragan et al., Serial two-photon tomography: an automated method for ex-vivo mouse brain imaging. Nat Methods. Sep. 1, 2012;9(3):255-258.

Reyssat et al., Slicing softly with shear. Phys Rev Lett. Dec. 14, 2012;109(24):244301, 5 pages.

Sacconi et al., Microphoton multifocal microscopy exploiting a diffractive optical element. Opt Lett. Oct. 15, 2003;28(20):1918-20.

Shao et al., Multifocal multiphoton microscopy based on a spatial light modulator. Appl Phys B. Jun. 2013;107(3):653-657.

So et al., High-throughput nonlinear optical microscopy. Biophys J. Dec. 17, 2013;105(12):2641-54.

So et al., Two-Photon Excitation Fluorescence Microscopy. Annu Rev Biomed Eng. Aug. 2000;20:399-429.

Tang et al., Combined multiphoton microscopy and optical coherence tomography using a 12-fs broadband source. J Biomed Opt. Mar.-Apr. 2006;11(2):020502. 3 pages.

Wang et al., Reconstructing micrometer-scale fiber pathways in the brain: multi-contrast optical coherence tomography based tractography. Neuroimage. Oct. 15, 2011;58(4):984-92.

Webb et al., A wide-field time-domain fluorescence lifetime imaging microscope with optical sectioning. American Institute of Physics, Review of Scientific Instruments. Mar. 2002;5139:1898-1907.

International Preliminary Report on Patentability for Application No. PCT/EP2011/066246, dated Mar. 28, 2013. 10 pages.

International Preliminary Report on Patentability for Application No. PCT/US2014/072368, dated Jun. 28, 2016, 9 pages.

International Search Report for Application No. PCT/EP2011/066246, dated Jan. 23, 2012. 5 pages.

International Search Report for Application No. PCT/US2011/060831, dated Jul. 17, 2012. 7 pages.

International Search Report for Application No. PCT/US2016/022106, dated Jun. 17, 2016. 3 pages.

U.S. Appl. No. 11/442,702, filed May 25, 2006, 2007-0057211, Abandoned.

U.S. Appl. No. 15/815,536, filed Nov. 16, 2017, U.S. Pat. No. 10,598,597, Issued.

U.S. Appl. No. 13/297,035, filed Nov. 15, 2001, U.S. Pat. No. 8,771,978, Issued.

U.S. Appl. No. 14/300,425, filed Jun. 10, 2014, U.S. Pat. No. 9,983,134, Issued.

U.S. Appl. No. 15/989,886, filed May 25, 2018, U.S. Pat. No. 10,908,087, Issued.

U.S. Appl. No. 15/192,345, filed Jun. 24, 2016, 2016-0377546, Published.

U.S. Appl. No. 15/556,862, filed Sep. 8, 2017, U.S. Pat. No. 10,788,403, Issued.

U.S. Appl. No. 16/462,035, filed May 17, 2019, 2019-0301980, Published.

\* cited by examiner $<x^2> = 6Dt$

SYSTEMS AND METHODS FOR SERIAL STAINING AND IMAGING

RELATED APPLICATIONS

This application is a continuation of U.S. patent application Ser. No. 15/556,862, filed Sep. 8, 2017, now U.S. Pat. No. 10,788,403, which was a national stage filing under 35 U.S.C. § 371 of International Application No. PCT/US2016/022106, filed Mar. 11, 2016, which claims priority to U.S. Provisional Patent Application No. 62/131,492, filed Mar. 11, 2015. The entire contents of each of the aforementioned applications is incorporated herein by reference.

BACKGROUND OF THE INVENTION

A major challenge in biomedical science today is to obtain information about how tissues and whole organs function. While advances in genomics and proteomics have led to fundamental discoveries about the basic working of DNA, protein and cell biology, there has been limited success in turning these discoveries into effective drugs or therapeutics. A leading reason behind this failure is that DNA, protein and cells often function very differently in-vitro than they do in the complex 3D environment of tissue and whole organisms. As such, it has often been necessary to follow these in vitro studies with animal and histopathological analyses.

Unfortunately, contemporary histological practices are ill-suited to image and stain whole organs and 3D tissues at the microscopic level with biochemical specificity, particularly in a high-throughput, automated manner. First, traditional optical microscopy techniques have limited ability to image deeply into the optically opaque environment of 3D tissues and are normally limited to a depth of a few tens of microns. Second, even with appropriate imaging methods, there is still the fundamental difficulty of getting staining reagents to penetrate deeply and evenly into tissues, particularly throughout whole, wild-type organs. Diffusion, due to its random walk nature, is a poor transport mechanism to distribute biochemical labels over large tissue volumes, even for small molecular weight labels. For larger labels such as antibodies, the problem is made even worse by steric constraints that restrict the movement of the antibody into tissues. Also, problems with nonspecific interactions and uneven distribution of labels are magnified when staining large tissue volumes, and these can conceal and confound the underlying biochemical signatures.

Serial section analysis is the traditional approach to label and image thick tissues. In serial section analysis, a thick tissue or organ is mechanically sectioned with a microtome or other device into thin slices ranging in thickness from tens of nanometers to hundreds of microns. These sections are then mounted onto slides, stained with dyes or markers of interest, and then transferred to a microscope or slide scanner where they are individually imaged. These resulting images are then successively aligned to form a z-stack. Unfortunately this is a costly and massively labor intensive procedure. Moreover, since the sections from the tissue block are imaged after they have been removed from the tissue, irreducible artifacts introduced from the sectioning process are virtually impossible to correct post hoc. As such, the serial section analysis requires days to weeks of effort from a skilled histologist and the resulting datasets are often of poor quality.

Other methods are being developed to address whole organ imaging include tissue clearing methods that make tissues more optically transparent. These methods make it possible to image more deeply into tissues and employ optical methods that were previously restricted for use in smaller samples. However, these methods have several drawbacks. They are often not robust, have high failure rates, and in many cases require extensive tissue preparations that take weeks to months and so are not amenable to high throughput environments. Further, they often distort the morphology and the underlying biochemical signatures that are being investigated in the first place. Most importantly, however, these clearing techniques do little to address the staining problem as it is still not possible to evenly distribute dyes and other markers throughout the tissue when it is cleared. Other related techniques attempt to introduce labels into the tissue by using the vasculature of the animal during the perfusion fixation process. However, these techniques suffer from uneven distribution throughout the organ especially in the case of antibodies.

Several blockface imaging methods have attempted to address the problem of labeling and imaging whole organs. However, this technique has several drawbacks. First, unlike the present invention, only the surface of the tissue is imaged and not the interior of the tissue. This is a significant disadvantage as the surface of the tissue of the tissue block is damaged by the sectioning process that is required to expose the tissue surface. Thus, a continuing need exists for improvements in high throughput imaging of tissue samples and organs.

Prior devices allow for successive thin sections to be cut from an agar embedded biological sample and where the sections can be sorted into a collection chamber after being cut from the block. The device allows the sample to be incubated with a staining dye for imaging. However, the method is impractical as the time for penetration of the dye into the tissue sample thus is prohibitively long, being on the order of days to weeks to stain and image a single sample such as a mouse brain, limiting its widespread use, especially in applications where tens to hundreds of samples must be imaged in single study. Beyond the impractical time frame for imaging a sample, this will also occupy valuable time on the instrument while the sample is incubating. Thus, continuing improvements are needed to increase imaging speed of large numbers of tissue samples utilizing staining techniques.

SUMMARY

Preferred embodiments of the present invention provide systems and methods for ex vivo staining and imaging of thick tissues and whole organs that can be termed serial blockface staining (SBS), for example. Preferred systems and methods employ automated cycles of staining, 3D surface and subsurface imaging and sectioning which repeats throughout the entire organ or a specific region of interest in a tissue sample. A staining system, a sectioning system and one or more imaging systems can be integrated into a high throughput sample processing system that generates three dimensional datasets. As each layer of the sample is imaged and sectioned, a stain or label is diffused into each sequential exposed surface. Stains or labels are selected and delivered directly onto the exposed sample surface immediately upon sectioning under conditions operative to increase the rate of diffusion such that the next layer can be promptly imaged and sectioned. The sample can be processed during diffusion with methods and devices that increase the rate of diffusion.

A preferred embodiment includes a sample holder that supports a plurality of samples such that the samples can be stained, imaged and sectioned in rapid sequence. While a first sample is being imaged, a second sample can be sectioned, while third and fourth samples are being stained, for example. Thus, each sample can be positioned at imaging, sectioning or staining stations of the system during the processing sequence. Imaging processes preferably include multiphoton microscopy, which can be used with additional imaging modalities.

Of critical importance is the coordinated control of the sample processing and imaging sequence. A control system is utilized to control sample processing parameters. The processing parameters must be properly coordinated for the type of sample, the stain being utilized, the targeted cellular structures to be imaged. The different stains and tissue types can have different diffusion rates and time windows in which to optimize the quality of the images that are produced. Different types of diffusion devices can be used separately or in combination to achieve the desired results. The diffusion devices are operative to increase the rate of diffusion beyond that encountered by gravity or the steric properties of the tissue and stain combination. Diffusion devices can be operative to change a property or characteristic of the material during diffusion to increase the rate. Such properties can include the temperature, stirring or agitation, such as by an acoustic signal having a selectable amplitude or frequency, the application or electric and/or magnetic fields, such as electrophoresis. Detergents or reagents can also be used to increase diffusion rate. Thus diffusion devices can include a reagent delivery device that is also operated by the control system to operate in conjunction with the stain delivery system and other diffusion devices. Control signals can be delivered using a control circuit that is electrically connected to all of the system components, including the sample holder to position the sample, the stain and reagent delivery system, the diffusion device components, the sectioning tool, as well as the different imaging systems that can be selected to image the sample at selected times. The control system can also be integrated into the image and data processing systems used to collect and process sample data. Software modules can be programmed along with a graphical user interface to select scan parameters for a particular sample or class of samples. Pre-sets of scan parameters that are correlated for different categories of imaging operations can also be utilized. Thus, a user can select a particular pre-programmed set of correlated sample processing and scan parameters for a particular sample class to provide fully automated processing of the samples. Timing of the steps of the processing sequence can be critical depending on the particular sample and processing conditions.

DETAILED DESCRIPTION

Figure 1:
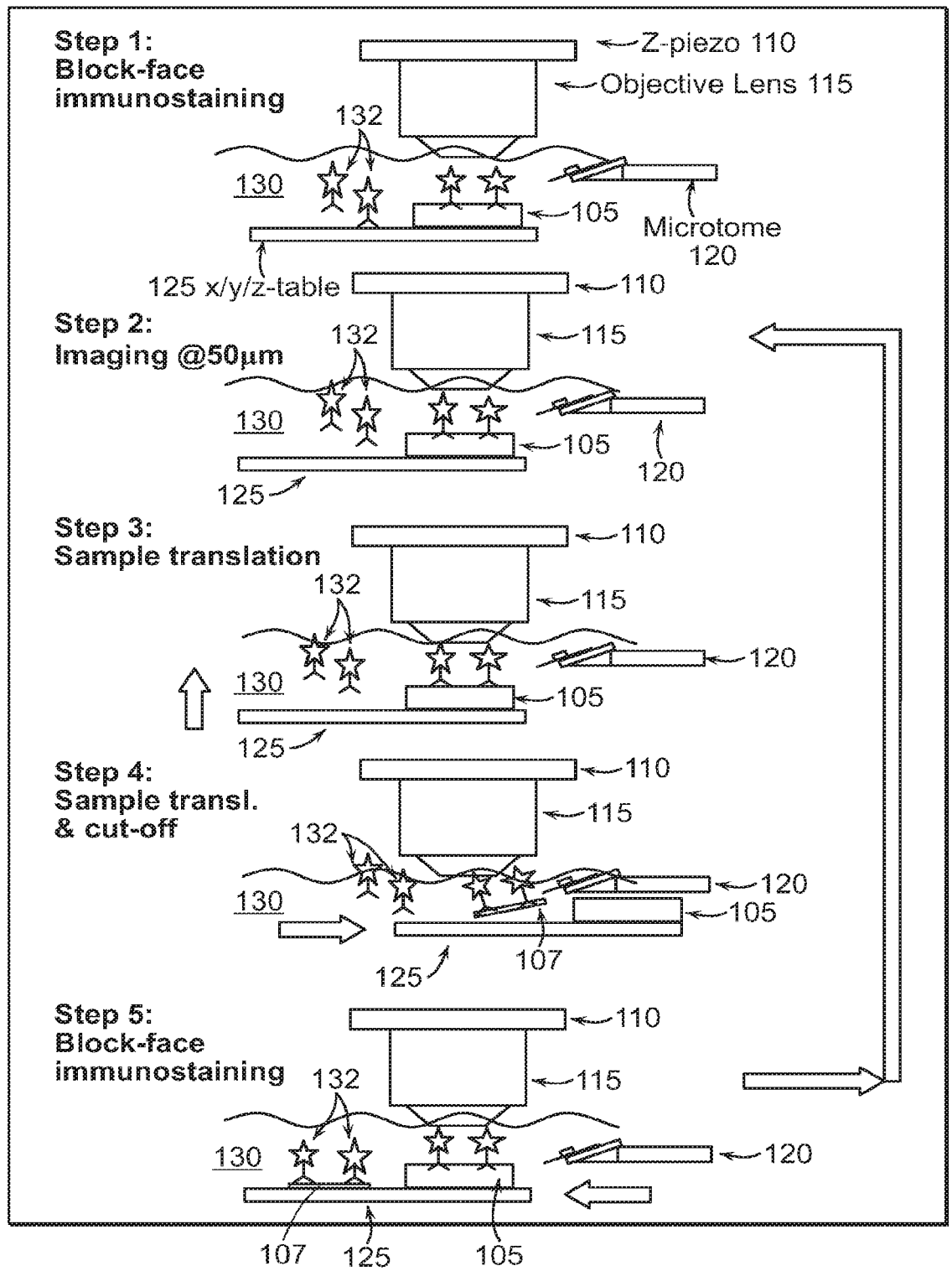
FIG. 1 depicts a sequence of steps in accordance with a preferred embodiment of the invention.

The sample is placed in a solution container located on a stage. The sample can be embedded in a support matrix such as agarose to facilitate mechanical sectioning. In the container, the sample is incubated with a staining reagent for a pre-determined incubation time such that the uppermost portion of the tissue exposed to the staining solution is stained to a desired depth. Following incubation, the system acquires images of the stained tissue at a plurality of planes in the tissue. The uppermost portion of the sample is then sectioned by a cutting device such as a microtome, thus exposing a new tissue surface. Steps 2-4 repeat throughout the entire organ such that the entire organ or tissue block is imaged at set intervals throughout its extent.

Systems and methods for two-photon microscopy are described further in So et al., for example in U.S. Pat. Nos. 7,372,985 and 7,724,937, which are incorporated herein by reference in their entirety. These describe an alternative technique that is capable of successively imaging the uppermost portion of a tissue block by alternating mechanical and optical sectioning. Previous methods have required that an opaque substance be introduced into the substance to block optical signals such as fluorescence from the dyes or tissue within the tissue block. U.S. Pat. No. 7,372,985 employed imaging modalities such as two-photon or confocal microscopy that avoid the problem of interference by only exciting a thin optical layer on the surface or within the layer. However, a more significant disadvantage is that dyes still must be introduced into the thick tissue block before the imaging and sectioning process. Again, like with optical clearing techniques, it is either very difficult or impossible to distribute dyes and other markers evenly throughout the tissue. One attempt to address this problem is by employing electrophoresis-assisted staining of materials to reduce the amount of time to stain a tissue and to evenly distribute the stain throughout a thick tissue block. This method requires that the stain possess an appropriate electric charge, which is not always feasible. Alternatively, in the case of antibodies, a charged secondary antibody can be attached to the antibody of interest. However the primary—secondary antibody complex is very large and has difficulty traversing the tissue due to steric constraints and can become trapped within the tissue and thus lead to spurious or nonspecific staining. Further, the process is slow requiring over a day to transport the stain an appreciable distance. The electric field itself can also distort the tissue due to the forces exerted on charged particles within the tissue. These problems are not easily overcome as it is often impossible to obtain a balance between an appropriate electric field strength to increase the distance traveled by the charged dye and to maintain a force small enough to not damage the tissue. Another difficulty arises when attempting to stain a material with multiple stains as the stains will often have differing or even opposite charges, thus limiting the ability to multiplex the staining protocol.

Thus, prior methods have various drawbacks, being either labor intensive, inconsistent, time-consuming, or having fundamental difficulties in introducing labels deeply into tissues. Because of this, current 3D imaging techniques and technologies often rely on endogenous fluorescence or the use of transgenic animals to generate contrast. The invention described here will remove this barrier and allow researchers to stain whole organs with a wide range of reagents such as antibodies and dyes that will open up new applications for whole organ, 3D imaging of animals.

Serial Two-Photon (STP) Tomography with blockface labeling utilizes two-photon imaging and vibratome sectioning to image the whole organ using sequential cycles of imaging and sectioning, thus enabling imaging deep into tissue. Serial Blockface IHC utilizes tissue staining techniques adopted from methodologies of free floating IHC and integrates it into a STP tomography platform. There are several complementary features between free-floating IHC and serial two-photon tomography that allow ready integration. First, both are conducted in solution. Second, the specimen in both is typically embedded into a porous support matrix such as agar; and third, both employ sectioning. In the case of STP tomography, sectioning is used to expose a new surface after the imaging step in order to allow imaging tens to hundreds of microns below the surface of the embedded tissue in a sequential fashion as demonstrated in FIG. 1. For free-floating IHC, the organ is typically sectioned into 30-50 μm slices which are placed in the staining buffer to allow rapid diffusion of staining reagents from both sides of the section, hence the term free floating IHC. In standard free-floating IHC, antibodies and staining reagents readily diffuse into 50 μm thick sections.

Figure 2A:
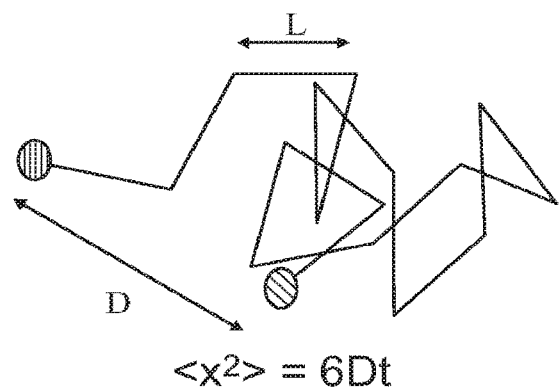
FIGS. 2A-2D illustrate diffusion processes pertaining to operation of preferred embodiments of the invention.
Figure 2B:
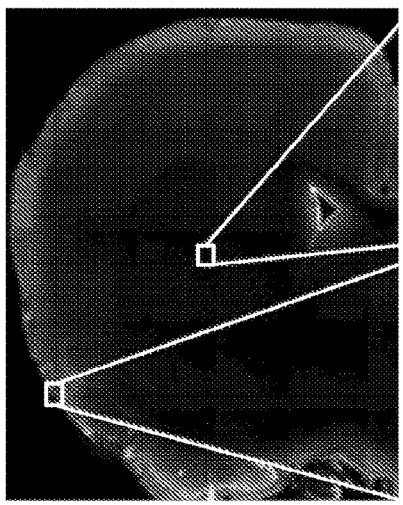
Figure 2C:
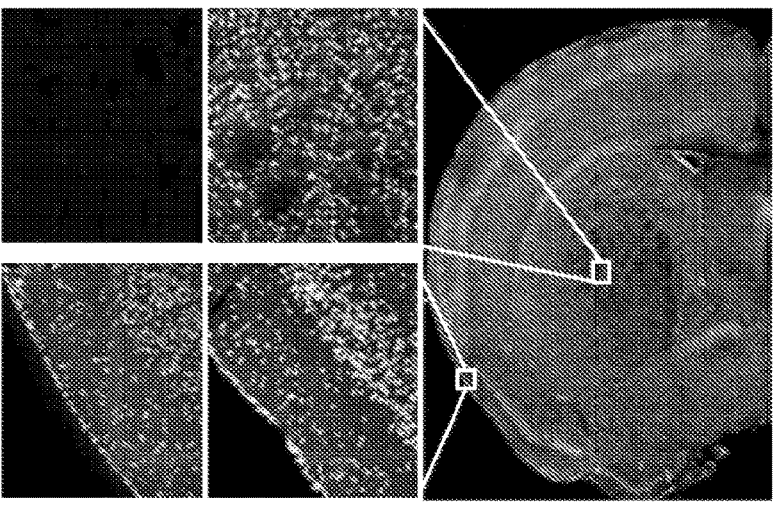
Figure 2D:
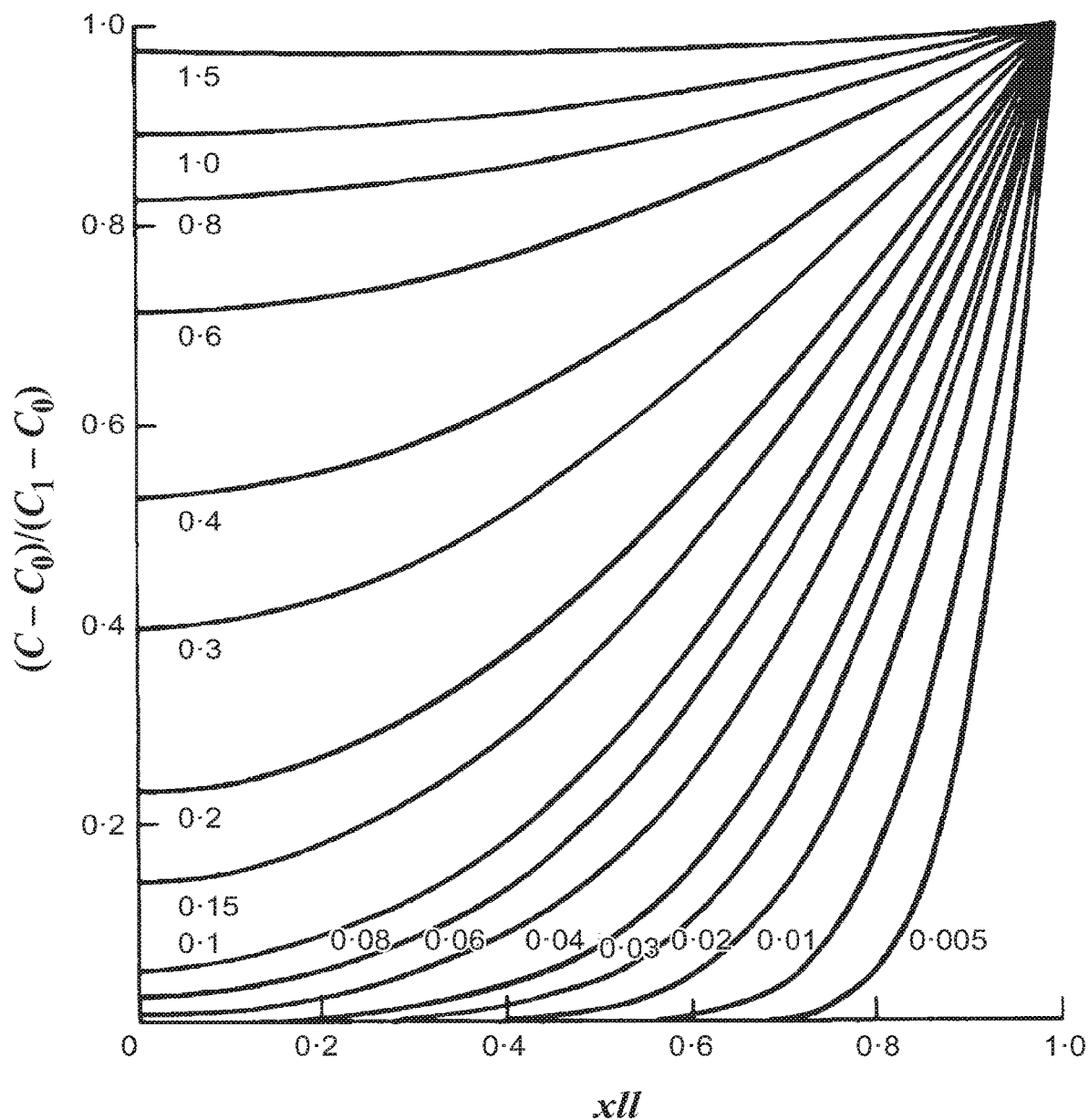

Note that in free floating IHC, it is possible to stain 50 micron tissue sections but is much more difficult to get antibodies and other labels to diffuse much beyond this into thicker tissues. There exists a substantial concentration gradient from the surface to the interior of the tissue due to the long distance the molecules must travel and the time to reach a concentration equilibrium. Diffusion, being a random walk process, does not transport molecules over long distances in a reasonable amount of time as can be seen in FIGS. 2A-2D. In FIG. 2A, the average mean square distance of a particle undergoing a random walk with step size L is illustrated. Since the average mean square diffusion distance goes as the square root of the diffusion coefficient, increasing the diffusion coefficient only marginally improves the penetration depth. In FIG. 2B, a whole mouse brain is placed in a DAPI solution in order to stain cellular nuclei. After 24 hours, the brain is sectioned and the exposed surface is imaged. Even after soaking the whole brain for 24 hours in a DAPI solution, only about 300 microns along the edge of the brain was stained and essentially zero staining occurred in the interior. In other words, very little of the dye was able to penetrate to the interior of the brain. In FIG. 2C, in contrast, a whole mount brain was sectioned in half and the exposed surface was allowed to incubate in the same DAPI solution. After 20 minutes of en face DAPI staining, the entire coronal section was homogeneously stained 50 microns into the tissue, and here was even staining of all the nuclei at 50 microns below the surface of the tissue. This illustrates a key point: while it is impractical to get molecules to diffuse deeply into a thick tissue, it is possible to get molecules to diffuse quickly to a shallow depth. Mathematically, this is illustrated by comparing the characteristic diffusion time ($t=l^2/D$) for an antibody at 50 μm and 5 mm where l is the diffusion length, D the diffusion coefficient, and t the time. Assuming a diffusion coefficient of $1*10^{-10}$ $cm^2/s$ for an antibody within a tissue, the characteristic time to diffuse 5 mm (halfway across a mouse brain) is 480 days.

In comparison, the time to diffuse 50 μm is 7 minutes. For small molecules such as DAPI, the time is even shorter. More generally, FIG. 2D (taken from Crank, *The Mathematics of Diffusion*, 1975) plots relative concentration gradients for a slab of material of width 2 L. Concentration distributions are shown at various times in the sheet −L<x<L with initial concentration $C_0$ and surface concentration $C_1$. The numbers on the curves are values of $Dt/L^2$. As we can see, increases in the diffusion coefficient or length of time have only modest effects on the penetration depth into the slab.

Preferred methods include those illustrated generally in FIG. 1, which illustrates a workflow for serial blockface staining including serial cycles of staining, imaging, and sectioning that can occur throughout the entire tissue. By repeating this series of steps, staining, imaging, and sectioning of an entire organ can be performed without any user intervention. A whole specimen is placed in a buffer bath filled with a solution 130 containing staining reagents 132. The specimen can be placed in a support matrix to facilitate sectioning. The specimen is then sectioned to expose the tissue 105, followed by a pre-determined delay time before the next imaging and sectioning cycle. This will allow the staining reagents 132 to diffuse to the desired imaging depth at which point the system will image and section again. In some embodiments, an objective lens 115 and piezoelectric element 110 can be used to image the tissue 105. After the tissue 105 is imaged, the sample can be translated and undergo sectioning. In some embodiments, a motorized stage 125 can be used to translate the sample. The motorized stage 125 can translate in one, two, or three directions. The motorized stage 125 can bring the sample 105 to a sectioning element. In some embodiments, a microtome 120 can be used to section the tissue 105. The sectioning element cuts a section 107 from the tissue 105. In some embodiments, the cut section 107 can be positioned in an orderly fashion on the motorized stage 125. The next exposed blockface surface of the tissue 105 can now undergo staining as described above. The cycle of blockface staining, imaging and sectioning repeats throughout the entire organ until completion.

For some samples, it may only be desirable to obtain images of regions of the tissue sample at selected depths within each region of the sample. For example, short sequences of images may only be desired at depths of 0.1, 0.2, 0.5, or 1 mm or any other distance within a whole organ. To reduce the total time that would be spent staining and sectioning the entire organ, various embodiments of the present invention allow selection of processing parameters to be executed by a control system that calibrate the timing sequence between staining, imaging, and removing (e.g., sectioning) steps to generate images of regions of the sample at selected depths within each region of the sample. In some embodiments, the processing parameters are selected to calibrate the relative operation of a staining unit, a sectioning unit, and an imaging unit.

Blockface IHC completely utilizes two well established methodologies: free floating IHC and serial two-photon tomography and other imaging methods described herein. Unlike free-floating IHC in which we section the organ and stain the sections, in blockface IHC we section the organ but stain the organ. More precisely, the organ is stained before it has been sectioned from the organ and is also imaged before it is sectioned. The fact that labels can be made to readily diffuse tens of microns into thick tissue, taken together with the ability to image at tens of microns below tissue surface using 3D imaging, and centimeters across tissues and organs with STP Tomography, allows a practical method for whole organ ex vivo staining. Stated alternatively, by transforming the problem of whole organ imaging and staining into a problem of sequentially staining and imaging at a shallow depth, it becomes possible to quickly and evenly stain entire organs.

Figures 3A, 3B:
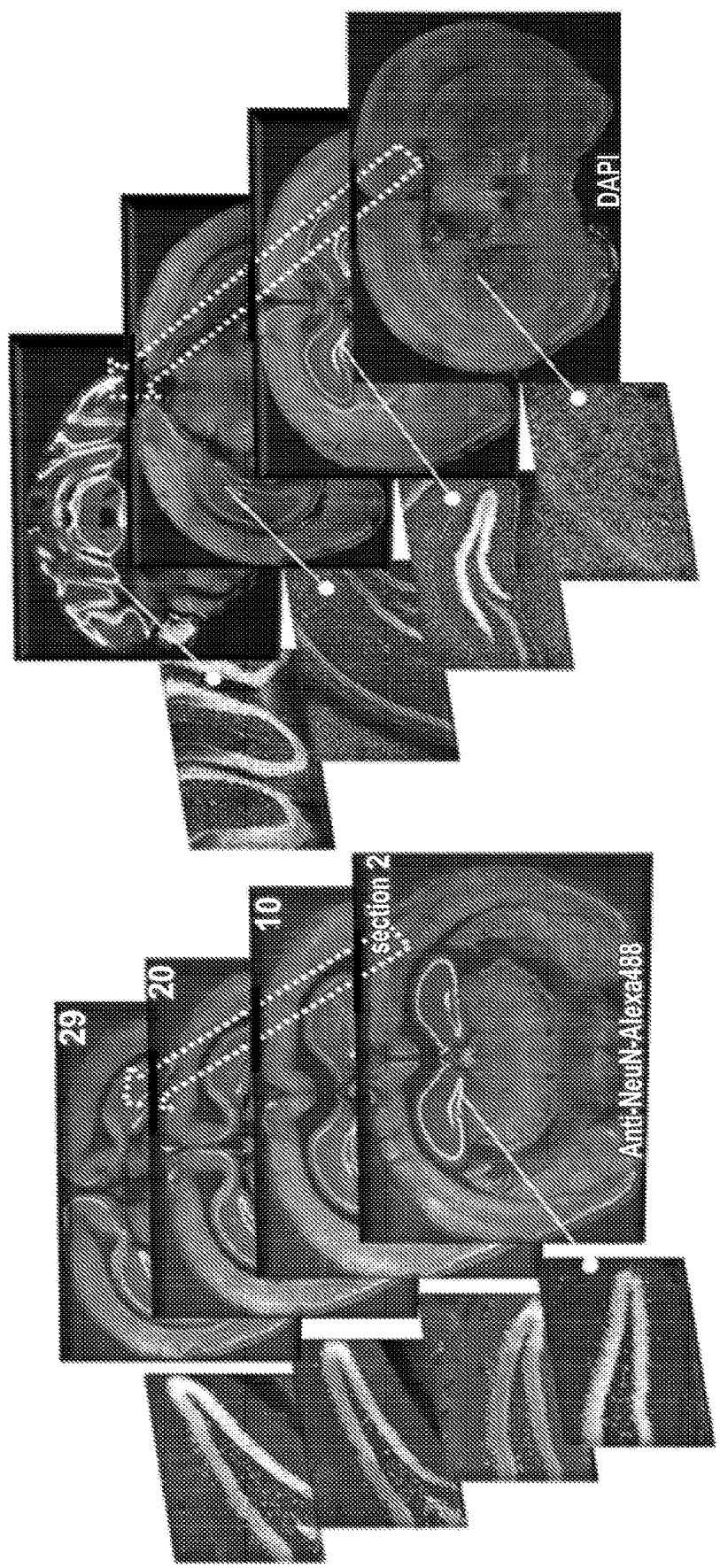
FIGS. 3A and 3B illustrate serial block face staining in accordance with the invention.

Demonstrated results from serial blockface staining are shown in FIGS. 3A and 3B. Shown are representative images from serial blockface IHC staining of a 1.5 mm coronal section (FIG. 3A) stained and imaged with anti-NeuN-alexafluor488 at 50 µm spacing and of small molecule staining of a whole brain using DAPI (FIG. 3B). Fixed tissue was embedded in an agarose block and directly mounted into a water bath containing either antibody in phosphate buffer with 1% Triton x-100 or DAPI in phosphate buffer. An incubation time was programmed into the STP system to allow tissue staining prior to the next cycle of imaging and sectioning. For FIG. 3B, staining and imaging occurred at 50 µm below the tissue surface at 50 µm intervals in consecutive automatic cycles across the entire brain for a total of 300 coronal stained sections. Four representative images from a 1.5 mm section stained with NeuN (FIG. 3A), revealing specific NeuN staining across the entire tissue, and four representative images from a whole mouse brain stained with DAPI (FIG. 3B) provide a strong proof-of-concept for the serial blockface staining approach proposed in this application. In preferred embodiments of this invention, the system is able to stain specimens at depths ranging from zero microns (i.e., surface) to 200 microns from the cut surface in less than 60 minutes.

Figure 4:
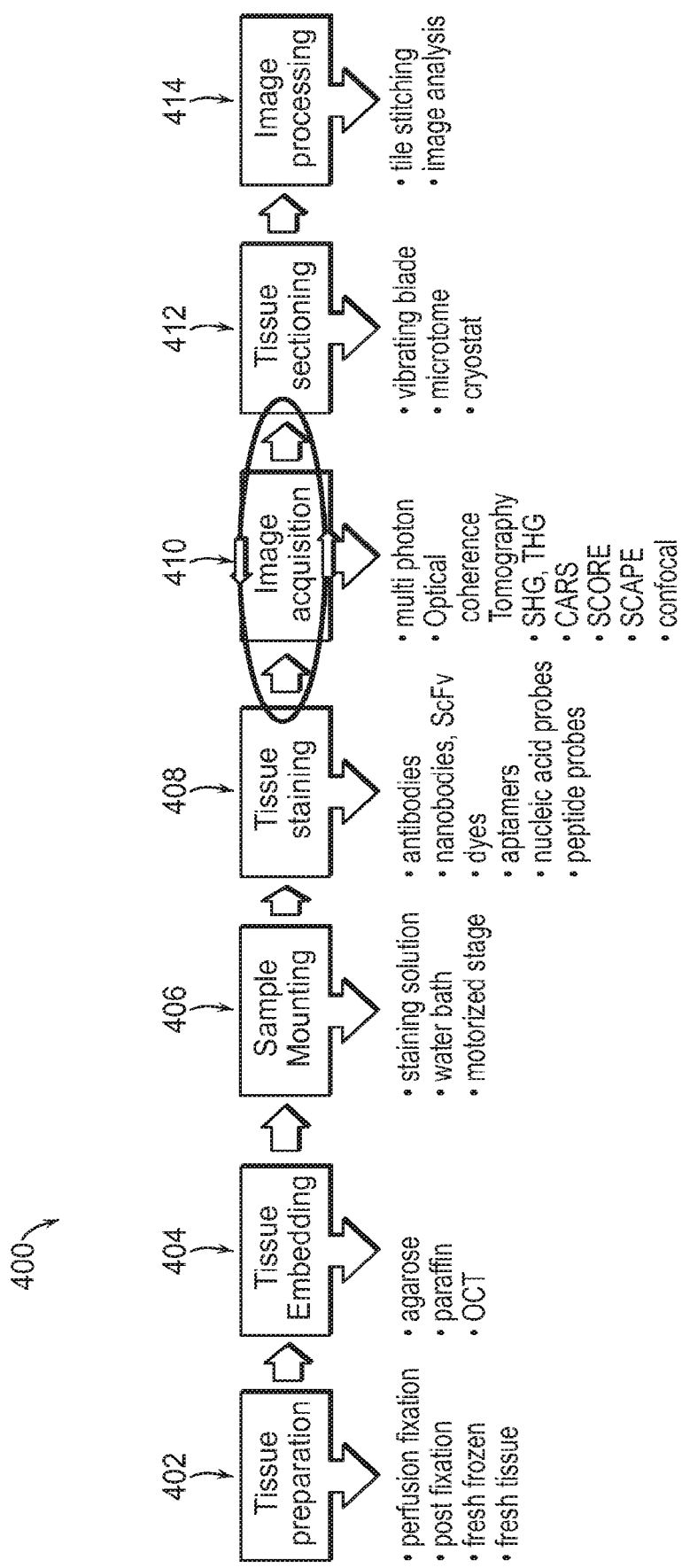
FIG. 4 illustrates a preferred embodiment for a workflow including tissue preparation, tissue embedding, sample mounting, tissue staining, image acquisition, tissue sectioning, and image processing in accordance with the invention.

FIG. 4 illustrates a general workflow 400 for the SBS method and details the different available techniques and modalities that can be integrated to allow an automated, sequential process of staining, imaging and sectioning whole organs. In accordance with various embodiments of the present invention, tissue preparation 402 can include perfusion fixation or post-fixation may involve fresh tissue or fresh-frozen tissue. Exemplary strategies for tissue embedding 404 can include, but are not limited to, agarose, paraffin, and OCT embedding. Sample mounting 406 for the tissue 105 can include the staining solution 130, a motorized stage 125, and, optionally, a fluid (e.g. water) bath.

Tissue staining 408 can include elements and reagents such as antibodies, nanobodies or single-chain variable fragment antibodies (ScFv), dyes, aptamers, nucleic acid probes, and peptide probes. For image acquisition 410, imaging modalities can include multiphoton, confocal, optical coherence tomography, second harmonic generation, third harmonic generation, coherent anti-Stokes Raman, swept confocally-aligned planar excitation, SRS, spectral confocal reflectance microscopy, SCORE, label free photoacoustic microscopy, and Raman confocal. Tissue sectioning 412 can include techniques including, but not limited to, vibrating blade, microtome 120, and or sectioning in a cryostat. Image processing 414 of images of the tissue acquired by the imaging system can include tile stitching or image analysis. The control system is operative to execute coded software instructions to perform the steps of the illustrated methods in accordance with specific timing requirements for the given sample class and associated sample processing and imaging requirements as described herein.

A preferred embodiment of this application includes staining a tissue sample with hematoxylin and eosin (H&E) stain and using a nonlinear imaging modality such as third harmonic generation to image the tissue sample. This can be used with other imaging protocols as generally described herein. The imaging parameters must be coordinated with the stain diffusion rate for optimized image results. The process is calibrated so that imaging depth is correctly timed with the modeled diffusion rate for a given class of samples. The timing sequence following delivery of the stain onto the cleaved surface of the tissue, the diffusion rate controls, imaging station sequence and further sectioning are coordinated by the control system operations.

Figure 5:
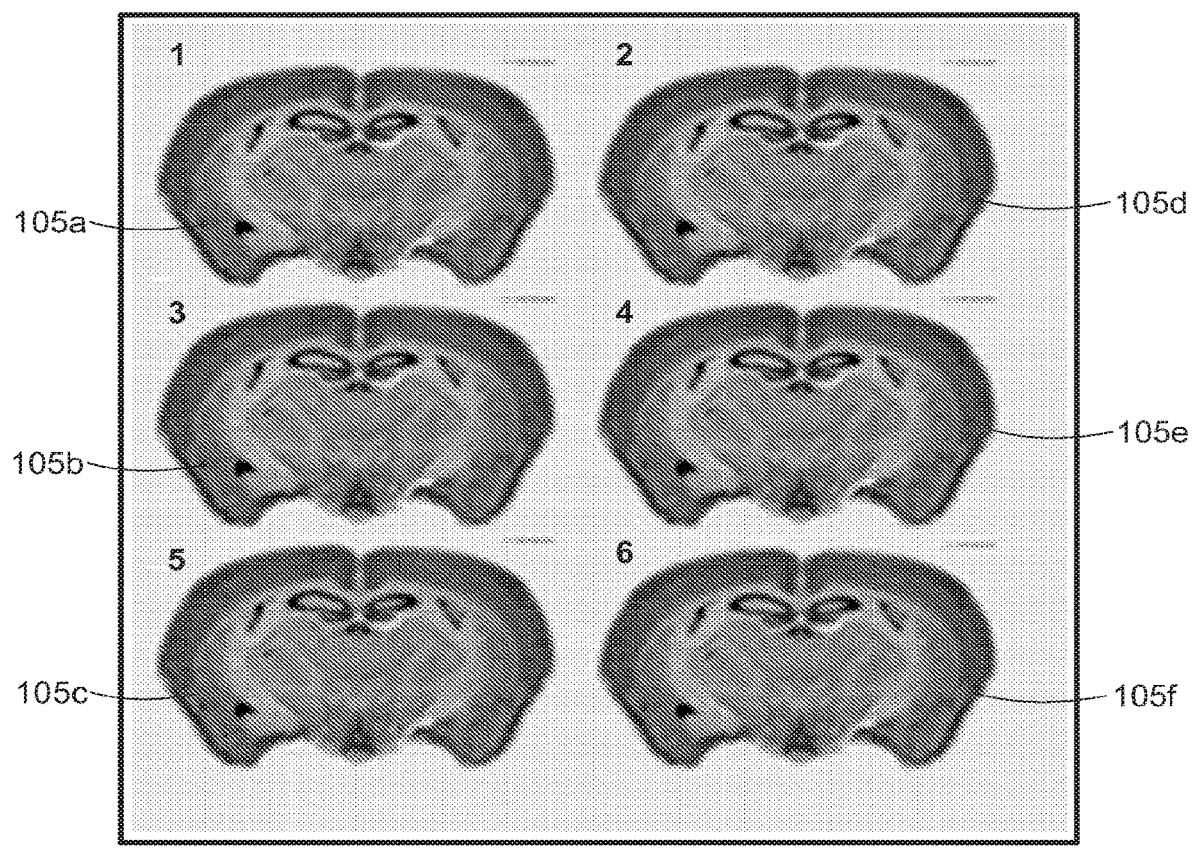
FIG. 5 illustrates a plurality of samples in a liquid medium for labeling and imaging.

In addition, more than one sample can be loaded into the water bath to facilitate multiple-sample imaging as seen in FIG. 5, which depicts a water bath in which six brains 105a-f are embedded to enable sequential labeling and imaging. Imaging multiple tissues 105a-f in parallel or sequentially provides several advantages. First, it can allow one tissue to be imaged while the other tissues undergo staining. This can increase the overall system throughput. For instance, if the imaging portion of the process takes 2 minutes and the staining process takes 10 minutes, six tissues can be sequentially imaged. The first tissue 105a is imaged and sectioned followed by the second tissue 105b. In this way, each tissue spends 10 minutes incubating in the staining solution while the system is imaging the other tissues in a round robin imaging strategy. In this way, while system latency is increased over imaging a single tissue with no staining, overall system throughput is maintained.

Several advantages of the approach include, first, this process combines the imaging and staining steps into a single, integrated process that can be performed on the same instrument. Serial section analysis, optical clearing with light sheet, and traditional blockface imaging are multi-step processes that require that the sample be first stained and then imaged in a second step on a separate device. This requires more manual intervention leading to undesired variability of results due to inconsistency between separate users or variability of the staining reagents from sample to sample. Second, the entire process is automated and thus of potentially lower cost. The automation also lends itself well to high throughput environments where tens if not hundreds of samples need to be stained and imaged under identical conditions.

In compatibility with our current system requirements and in accordance with standard staining techniques, an animal is perfused with 4% PFA and the organ of interest is then dissected. Following additional post-fixation in 4% PFA, the organ is than placed in PBS in order to replace PFA. The method is not limited to PFA-perfused animals and could also be applied on post fixed organ or fresh frozen tissue. Once dissected, the organ is embedded in a supporting matrix such as agarose and is then mounted onto a glass slide. Since imaging and sectioning of whole organs using STP is conducted in solution, the slide is placed in a water bath that is then mounted on a motorized stage. There is much flexibility with the working solution in which the sample is placed and any solution that will not damage the tissue, staining reagents or microscope components can be used.

This approach is consistent with standard staining techniques for fixed tissue, enabling the use of a wide array of staining reagents. These include but are not limited to:
  Antibodies
  Nanobodies and ScFv
  Dyes
  Aptamers
  Nucleic acid probes
  Fluorescent peptide probes
  Nanoparticles
  Quantum dots
  Photo-acoustic probes A further embodiment uses a probe comprising gamma-PNA as miniprobes for fluorescent labeling. Further details regarding the characteristics and use of such miniprobes are described in International Application No. PCT/US2012/064976, filed on Nov. 14, 2012 by Armitage et al., the entire contents of this application being incorporated herein by reference.

In a preferred embodiment, reagents are diluted into the water bath and are incubated for the amount of time required for the molecule to diffuse to the imaging depth. Different molecules have different diffusion rates and permeability to the tissue and thus the time must be adjusted depending on the label. Note that while long incubation time increases overall imaging time, one or more diffusion devices may be employed to increase the rate of diffusion beyond that which occurs solely by gravity or un-aided diffusion and, in turn, decrease the incubation time. Diffusion devices can be divided into categories including chemical factors and physical factors.

Diffusion devices that employ chemical factors can increase section quality and tissue permeability:
  1. Detergents that are compatible with IHC
  2. Proteases for degradation of extracellular matrix Diffusion devices that employ physical factors can increase tissue permeability, diffusion rate and diffusion homogeneity:
  1. Agitation
  2. Temperature
  3. Sonication
  4. Electrophoresis
  5. Microwave Thus, preferred embodiments can employ diffusion devices including automated control systems and methods to actuate control of one or more of the above characteristics. A computer system having one or more data processors and memories can be programmed with software engines that operate all of the operating features of the processing system described herein, including the sectioning, sample movement stages, staining and imaging devices.

Figure 6A:
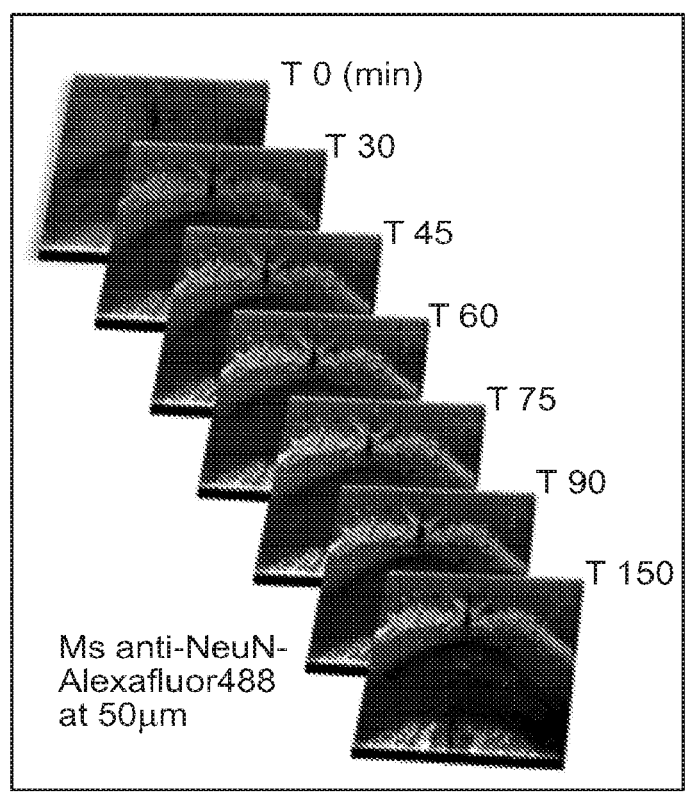
FIGS. 6A-6C illustrate options for increasing diffusion into samples in accordance with the invention.
Figure 6B:
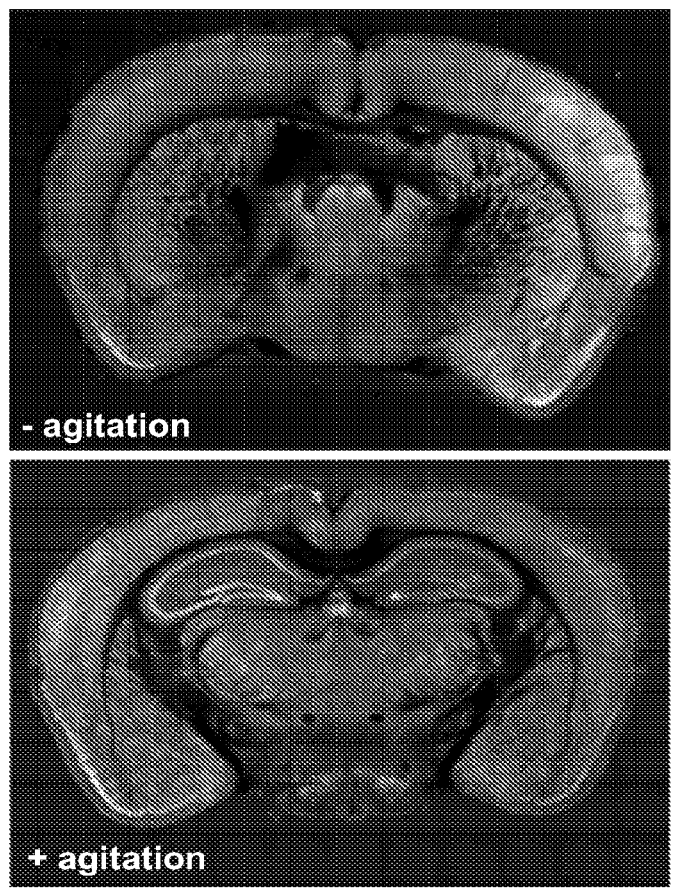
Figure 6C:
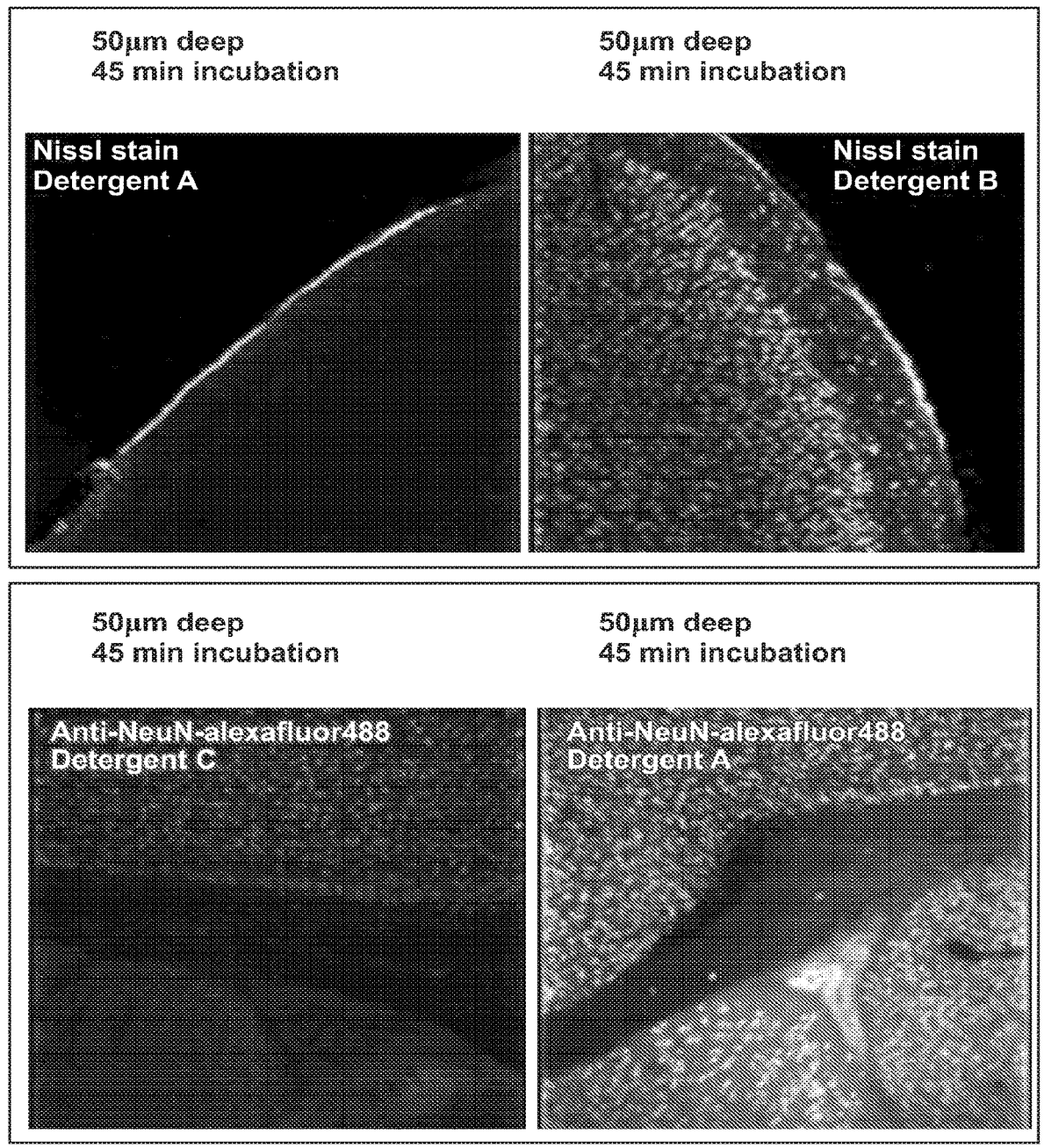

FIG. 6A illustrates the diffusion rate of anti-NeuN-alexafluor488 into embedded tissue by demonstrating the NeuN signal at 50 µm at several time points. NeuN signal is already visible at 30 minutes after incubation. Many commercially available detergents are compatible with IHC, and many of these have shown to be able to increase the diffusion of antibodies and reagents into thick samples. Different types of detergents can be used depending on their compatibility with IHC staining, mainly if they do not de-stabilize antibodies. For instance, Triton-X100 is one the most widely used detergents in IHC staining and has shown to significantly increase the penetration of antibodies into 50 micron tissue slices used in free floating IHC. When adding a detergent, detergent concentrations of at least 1×CMC concentration are added to the staining solution and are present throughout the SBS session to allow diffusion during incubation steps. In another preferred embodiment, depending on reagent diffusion and type of tissue, pre-treatment of tissue samples before imaging and staining may be conducted with detergents and/or proteases in order to further improve staining and sectioning. FIG. 6C provides an example of the impact that different detergents have on diffusion rate of antibodies and dyes by showing the difference in staining when incubated with different types of detergents. The amount of staining at a depth of 50 microns after 45 minutes of incubation with a fluorescent Nissl stain is much greater when detergent B is used versus detergent A. Similarly, for the antibody anti-NeuN alexa488, the signal at a 50 micron depth after 45 minutes of incubation was much stronger when detergent A was used versus detergent C.

Figure 7A:
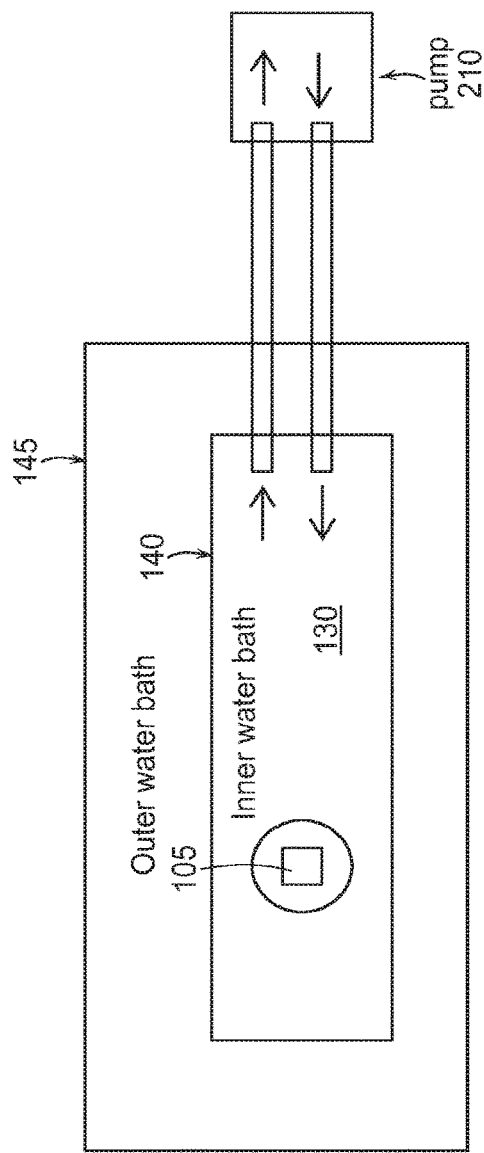
FIGS. 7A and 7B illustrate systems for increasing diffusion rates in samples.

Diffusion devices that include physical factors, such as agitation, heating, sonication and electrophoresis can be used alone or in combination with diffusion devices that include chemical factors to further increase diffusion rate. Agitation, routinely used in standard immunostaining techniques, is known to increase rates of diffusion and homogeneity. To demonstrate the effects of agitation on the diffusion rate, see FIG. 6B, where agitation of the sample while it is incubated with an antibody improves diffusion homogeneity as demonstrated by a more uniform NeuN signal across a coronal section compared to non-agitated sample. In some embodiments, sample agitation can be performed with a diffusion device such as a motorized stage 125 on which the sample is mounted. In some embodiments, the motorized state can also provide X-Y movement of the stage in between cycles while the tissue 105 is incubated. In some embodiments, circulating the staining solution 130 through a diffusion device such as a pump 210 can provide agitation during both imaging and incubation periods as shown in the water bath design of FIG. 7A. The staining solution 130 can be held in an inner water bath 140 that itself is held in an outer water bath 145. Circulation of the staining solution is also possible by physically stirring the solution using diffusion devices such as a stirrer or fan. In another embodiment, the sample can be transported to different stations during the imaging and staining process, including a station whose purpose is to physically agitate the sample.

Figure 7B:
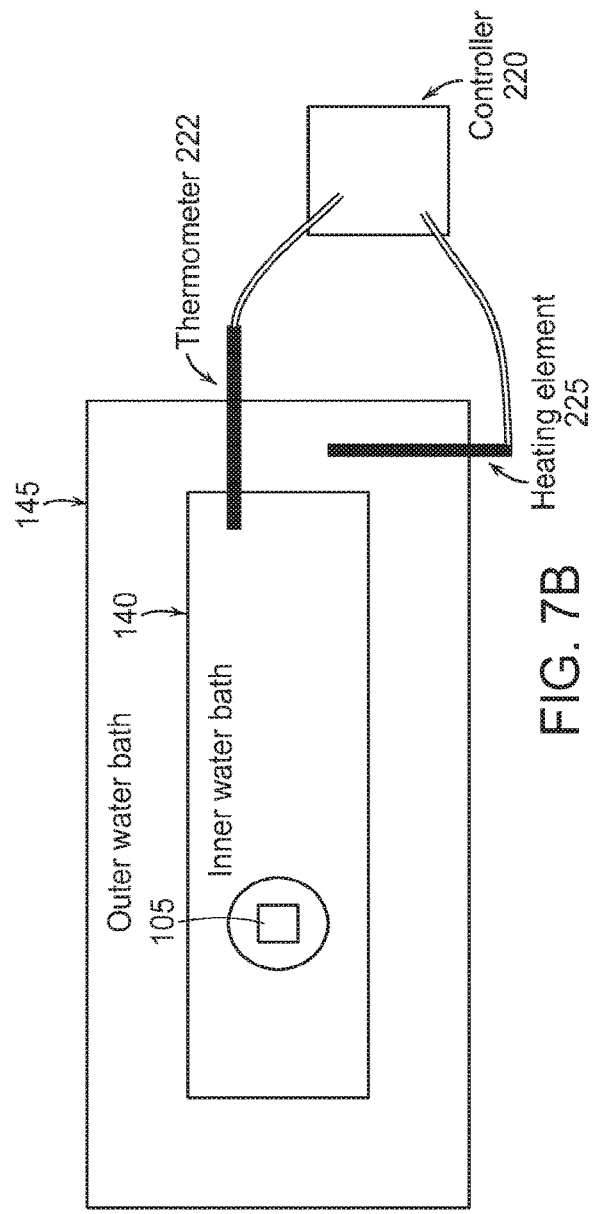

Heating also increases the diffusion rate and can be achieved by non-direct heating of the water bath in which SBS takes place. FIG. 7B illustrates a non-direct approach to heating the staining solution; the smaller SBS water bath 140 is placed inside a diffusion device including a larger water bath 145 with a heating element 225. The heating element 225 is connected to a controller 220 that is connected to a thermometer 222 placed inside the smaller SBS water bath 140. This loop allows us to heat the larger outside water bath 145 according to the temperature of the smaller inner water bath 140 containing the staining solution 130 and sample 105.

Figure 8:
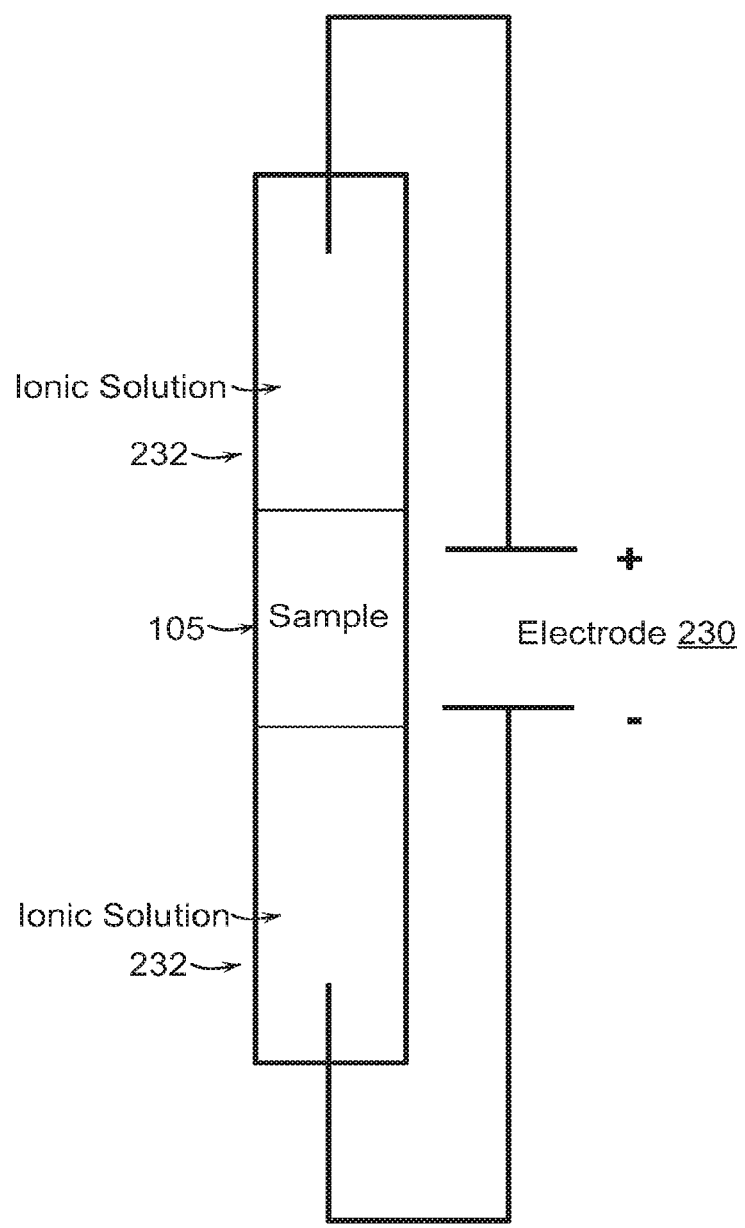
FIG. 8 illustrates an electrophoresis system for increasing diffusion rates in accordance with a preferred embodiment.

Electrophoresis provides directionality of diffusion and can speed up the diffusion of charged staining reagents (FIG. 8). The embedded tissue 105 can be placed in a diffusion device such as a custom-made electrophoresis chamber including an electrode 230 and ionic solution 232. The electrophoresis chamber can be incorporated into the water bath 140. Embedded tissue will undergo electrophoresis either during incubation time or throughout the entire imaging run. Pulsed electrophoresis can be applied to enable deeper diffusion across the tissue.

Figure 9:
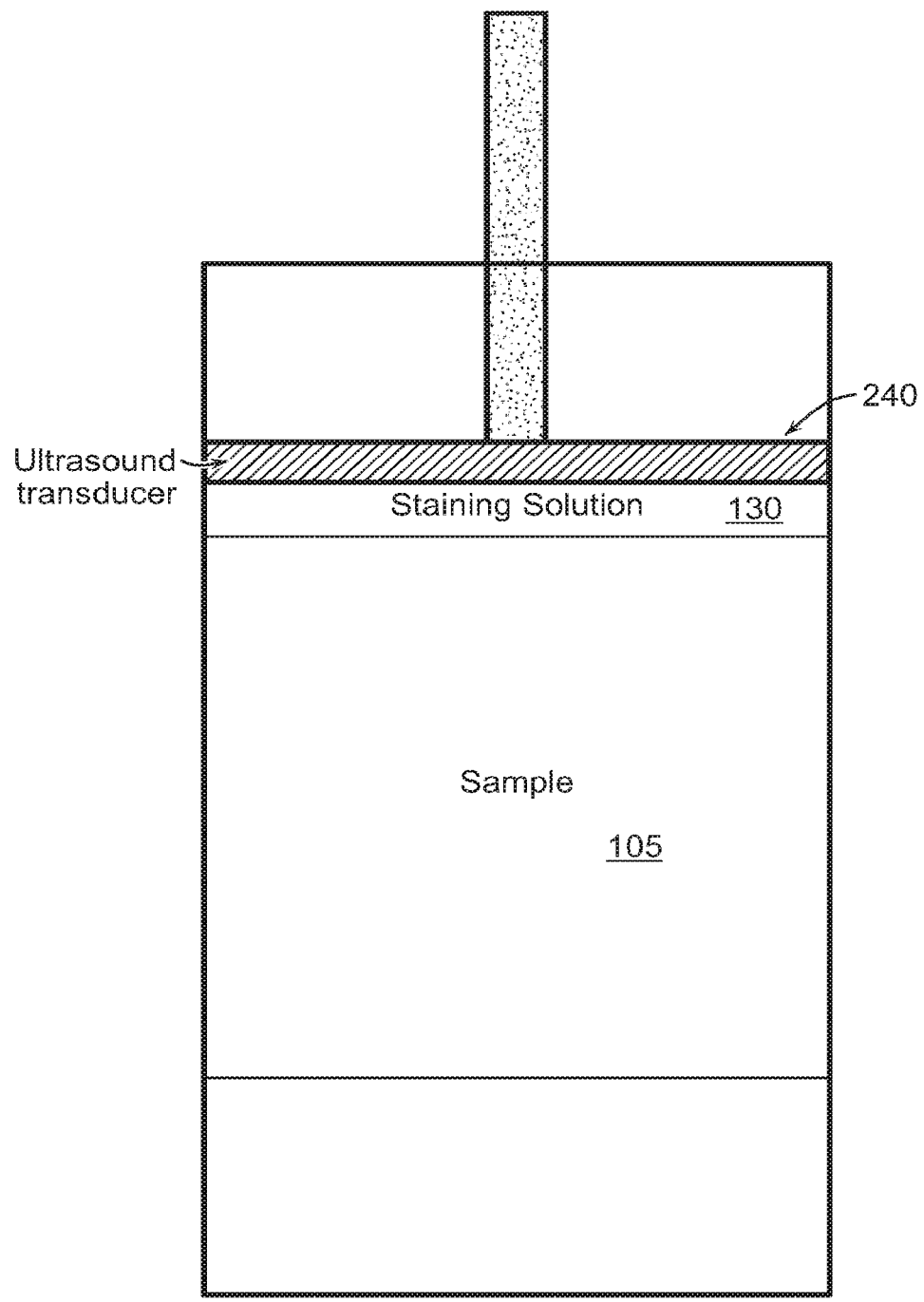
FIG. 9 illustrates a system and method of sonic agitation of the sample to increase diffusion rates.

Sonication causes tissue disruption and by doing so provide means for increased tissue permeability and improved penetration of the label into the tissue (FIG. 9). Sonication can be applied on whole tissue prior to embedding and/or directly on embedded tissue 105 during SBS incubation time. In some embodiments, a diffusion device such as an ultrasound transducer 240 can be placed in proximity to the staining solution 130 to cause sonication of the tissue 105 during a staining operation.

When using fixed tissue for SBS, there may be a need for antigen retrieval to ensure antibody binding. In such cases where antigen retrieval is necessary, the use of a diffusion device such as a histology microwave can be applied. Histology microwaves enable controlled, localized heating of fixed tissue and are commonly used for pathological analysis. Antigen retrieval using a microwave is a process which takes place in solution and is thus compatible with our SBS approach. A microwave can be integrated into the system and will be applied directly on the tissue during incubation time.

Depending on the type of sectioning and the type of tissue that is imaged, pre-treatment with diffusion devices such as tissue specific proteases may improve the quality of the sections to enable better imaging. Proteases may also degrade extracellular matrix and connective tissue to increase diffusion rate of staining reagents. When using antibodies and other protein-based staining reagents, tissue may be pre-treated and washed prior to conducting SBS to avoid degradation of the antibodies. In cases where dyes and other non-protein reagents are used, addition of proteases to the staining solution as diffusion devices can be selected. The automated control system for the diffusion devices can perform selection of one or more diffusion rate adjustment modes (e.g., temperature, vibration, electrophoresis, etc.) and apply selectable timing and diffusion device operating parameters.

Figure 10:
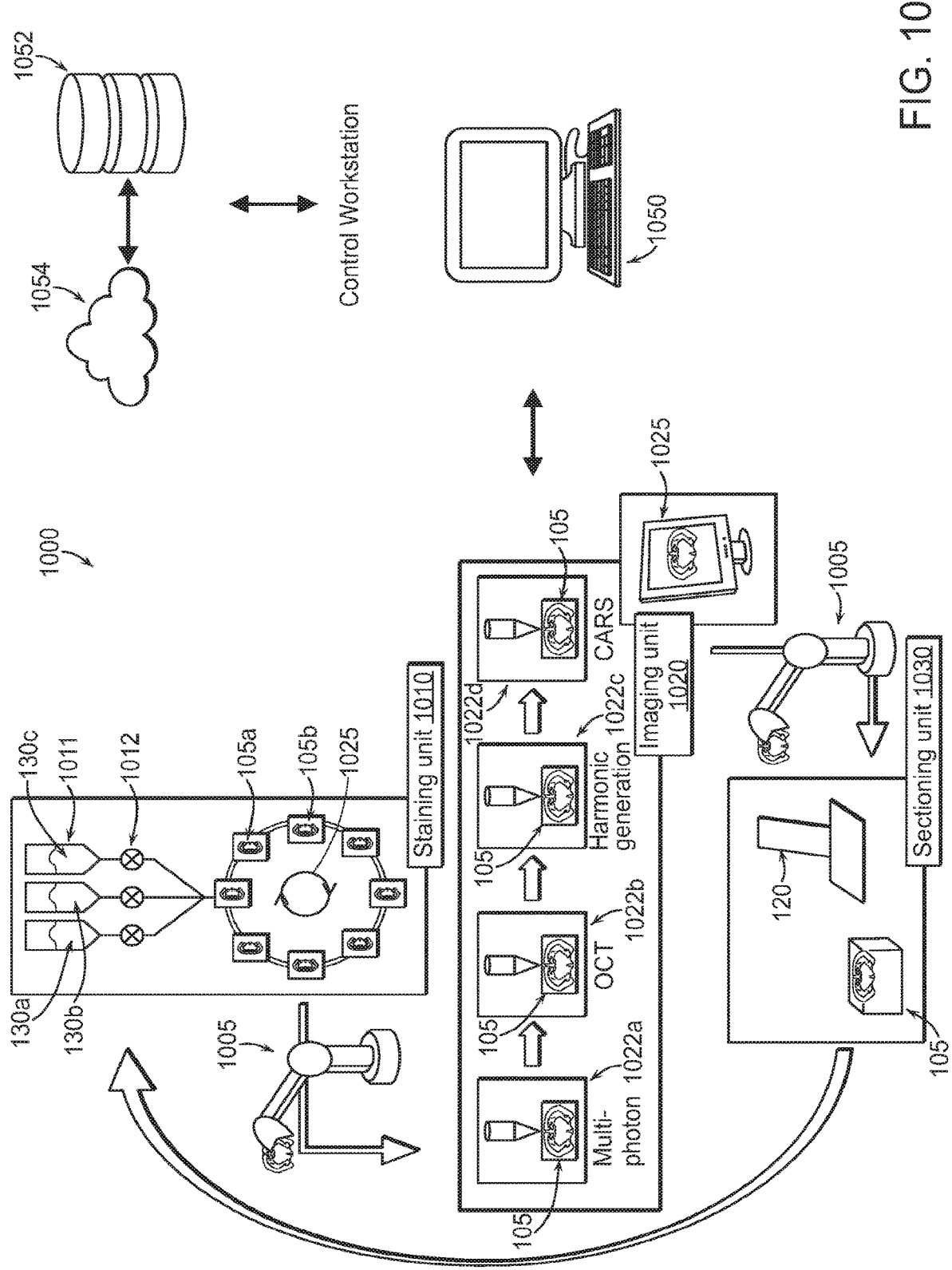
FIG. 10 illustrates a system for processing a plurality of samples for diffusion and imaging.

FIG. 10 presents a schematic of a serial blockface staining system. In one embodiment, the system 1000 includes a rotating stage 1025 with multiple samples 105a, 105b loaded simultaneously and comprises a staining unit 1010, an imaging unit 1020 and a sectioning unit 1030. In some embodiments, a robotic arm 1005 can transfer individual chambers which contain samples to various stations. As such, samples loaded on the stage 1025 will be mobile and can transfer between each of the units in a programmatic fashion. In accordance with various embodiments, a control workstation 1050 can configure or control the staining unit 1010, imaging unit 1020, sectioning unit 1030, or robotic arm 1005.

In one embodiment, the staining unit will have controlled solution dispensers 1011 to optimize and allow a variety of staining solutions 130a, 130b, 130c. This can also allow for different staining solutions to be used at different points in the imaging and staining session. In some embodiments, control of the solution dispensers can be performed using a valve manifold 1012 or series of valves. While the tissue 105 is incubating in the staining solution 130, one or more diffusion devices can be applied to increase the diffusion rate. Following staining, each sample can individually transfer to an imaging unit which can include several imaging modalities 1022a, 1022b, 1022c, 1022d. Although imaging modalities of multi-photon 1022a, OCT 1022b, multiple harmonic generation 1022c, and CARS 1022d are shown in FIG. 10, any imaging modality previously described herein or known in the art may be used in conjunction with the imaging unit 1020 as taught herein. The imaging unit 1020 can include a display 1025 in some embodiments to show images as they are acquired.

Following image acquisition, the sample 105 can then move to a sectioning unit 1030 to expose the next tissue surface to be stained in the staining unit 1010. The sectioning can be performed by a sectioning element 120 such as a microtome. This streamlined process enables efficient serial blockface staining of multiple samples in a way that enables the imaging of one sample while the rest are incubated with staining solution 130. The entire process can be automated and put under the control of a computer workstation, and staining and imaging parameters can be adjusted on a per sample and instar-sample basis. That is, for instance, particular regions of, for example, mouse brain can be stained with a reagent A which is of interest in the forebrain, and reagent B, which is of interest in the cerebellum. Further, the final or interim results can be transferred by the control workstation 1050 to hard disk storage 1052 or transmitted via server to remote locations using cloud computing resources 1054.

The following claims should not be read as limited to the order or elements as set forth unless expressly stated. The embodiments of the invention described herein that are within the spirit and scope of the following claims and equivalents thereof are claimed as the invention.

What is claimed is:

1. A system for imaging a tissue sample comprising:
an imaging system that images at least a portion of the tissue sample;
a sectioning system that sections tissue slices from the tissue sample;
a staining system operative to stain an exposed region of the tissue sample with a stain in sequence with sectioning of the tissue slices performed by the sectioning system, wherein the stain penetrates into the tissue sample to a penetration depth; and
a control system connected to the imaging system, the sectioning system, and the staining system wherein the control system controls sequential staining, imaging and sectioning of the tissue sample, the staining system being responsive to the control system to adjust a rate of penetration of the stain into the tissue sample to reduce the penetration time of the stain to a staining depth within the tissue sample.

2. The system of claim 1, wherein the imaging system is configured to use one or more of multiphoton, confocal, optical coherence tomography, second harmonic generation, third harmonic generation, coherent anti-Stokes Raman, photoacoustic, or Raman imaging techniques.

3. The system of claim 1, wherein the imaging system images the exposed region of the tissue sample and/or a subsurface region of the tissue sample.

4. The system of claim 1, wherein the sectioning system is configured to sequentially cut the tissue slices from the tissue sample to sequentially expose deeper regions of the tissue sample, each deeper region of the tissue sample having an exposed surface wherein the stain diffuses into the exposed surface at a diffusion rate.

5. The system of claim 4, wherein the imaging system images the sequentially cut tissue slices from the tissue sample.

6. The system of claim 4, wherein the sequentially cut tissue slices have a thickness in a range from 10 nanometers to 50 microns.

7. The system of claim 1, wherein the control system further comprises a memory to store images received from the imaging system.

8. The system of claim 7, wherein the control system further comprises an image processing system that is configured to process detected image data from the imaging system and generate a three-dimensional representation of the tissue sample.

9. The system of claim 1, wherein the stain is delivered to the sample with a detergent.

10. The system of claim 1, wherein the stain includes a protease.

11. The system of claim 1, wherein the system includes a motorized stage to move the tissue sample, agitate the stain, or both.

12. The system of claim 1, wherein the staining system includes a fluid pump to provide agitation by circulating the stain in a fluid bath containing the tissue sample.

13. The system of claim 1, wherein the staining system includes a stirrer or a fan to agitate the stain.

14. The system of claim 1, wherein the staining system includes a heating element in contact with a water bath, the water bath having thermal contact with the stain.

15. The system of claim 1, wherein the staining system includes a sonicator.

16. The system of claim 1, wherein the staining system further comprises a diffusion device that includes an electrophoresis chamber.

17. The system of claim 1, wherein the staining system includes a microwave to enable antigen retrieval.

18. The system of claim 1, wherein the sectioning system includes a vibrating blade, a microtome, or a cryostat.

19. The system of claim 1, further comprising a robotic arm to move the tissue sample relative to one or more elements of the staining system, imaging system, and sectioning system.

20. A method of producing sequential images of a tissue sample, comprising:
    staining a first surface of the tissue sample with a stain using a staining system to deliver the stain to a penetration depth within the tissue sample;
    imaging the tissue sample with an imaging device to generate an image;
    removing a section of the tissue sample with a sectioning system to expose a second surface of the tissue sample; and
    iterating the staining, imaging, and removing steps in response to a control system wherein the control system is connected to the sectioning system and the staining system such that a rate of penetration of the stain in the tissue sample is adjusted to control a penetration time of the stain to a staining depth in the tissue sample.

21. The method of claim 20, wherein the rate of penetration is adjusted by agitating the stain in a fluid bath that contains the tissue sample.

22. The method of claim 20, further comprising controlling a temperature of the stain with the control system.

23. The method of claim 20, wherein the staining system further comprises a diffusion device.

24. The method of claim 20, wherein the rate of penetration is adjusted by operating an electrophoresis device having an electrode coupled to an ionic solution.

25. The method of claim 20, wherein the step of staining further comprises applying one or more reagents to the tissue sample including an antibody, a dye, an aptamer, a nucleic acid probe, a fluorescent peptide probe, a nanoparticle, a quantum dot, a hematoxylin and eosin stain, an immunohistochemistry (IHC) stain, and a photoacoustic probe.

26. The method of claim 20, wherein the control system is configured to execute coded software instructions to execute one or more steps of the method in an ordered sequence, the control system having stored parameters to automatically control each step.

27. The method of claim 20, further comprising processing an entire animal organ.

* * * * *